VAN KING ROBINSON.
WATER HEATER.
APPLICATION FILED OCT. 18, 1916.
1,212,108.
Patented Jan. 9, 1917.
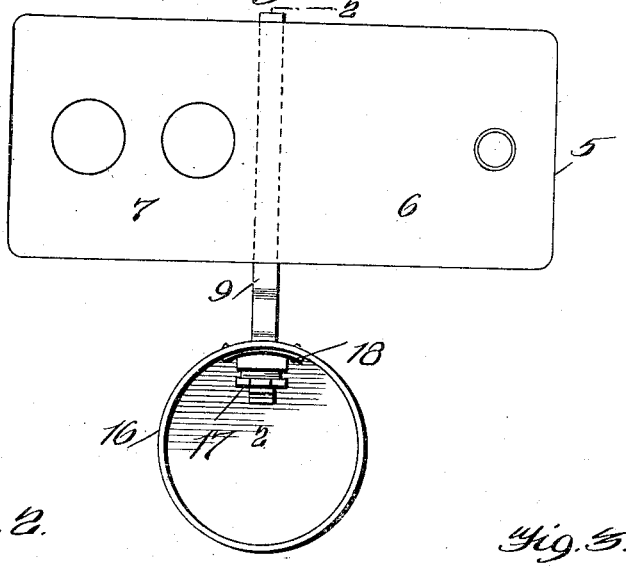
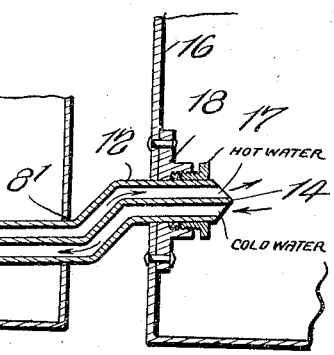
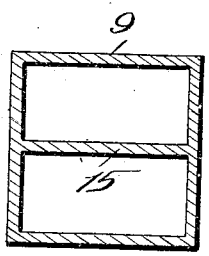
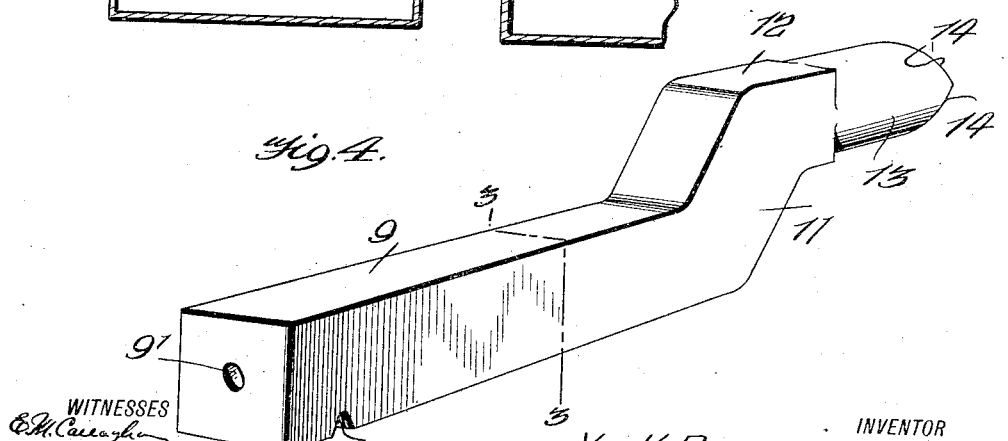
WITNESSES
INVENTOR
VAN K. ROBINSON,
BY
ATTORNEYS

UNITED STATES PATENT OFFICE.

VAN KING ROBINSON, OF GATUN, CANAL ZONE.

WATER-HEATER.

1,212,108.  Specification of Letters Patent.  Patented Jan. 9, 1917.

Application filed October 18, 1916. Serial No. 126,252.

*To all whom it may concern:*

Be it known that I, VAN K. ROBINSON, a citizen of the United States, and a resident of Gatun, Canal Zone, Panama, have invented a certain new and useful Improvement in Water-Heaters, of which the following is a specification.

This invention is an improvement in water heaters, and has particular reference to a heater attachment for cooking ranges and the like.

An object of the invention is the provision of a heater casing or a main body portion of novel construction adapted to be mounted contiguous to the fire-box of a range, and having connection with a tank for containing the water to be heated, whereby proper circulation is maintained.

Another object is to provide a heater of this character which is simple in construction, easy to manufacture, and effective in carrying out the purpose for which it is designed.

The inventive idea involved is capable of receiving a variety of mechanical expressions, one of which, for the purpose of illustrating the invention, is shown in the accompanying drawing, wherein—

Figure 1 is a top plan view of the heater, showing the same applied to a field cooking range; Fig. 2 is a section on the line 2—2 of Fig. 1; Fig. 3 is a section on the line 3—3 of Fig. 1, and Fig. 4 is a perspective view of the water heater constructed in accordance with my invention.

Referring more particularly to the drawing, the numeral 5 designates generally a field range, although it is to be understood that the invention may be used in connection with other ranges and stoves, such range consisting of an oven 6 and fire box 7, the latter having openings 8 and 8' in the sides thereof for receiving the water heater which comprises the essential feature of the invention. This heater 9 is mounted in position by inserting a poker or other implement through the openings 8 and 8' and engaging one end thereof in the end opening 9' so that the heater may properly be guided into position, whereupon the notch 10 in the bottom thereof will engage the bottom edge of the opening 8 and thus incline the heater slightly so as to obtain proper circulation.

The heater casing comprises an elongated body portion preferably of rectangular formation in cross section, one end of which is closed while the other end is continued to form the diagonally extending end portion 11 which projects upwardly and terminates in the extremity 12 parallel with the body portion. The portions 11 and 12 are also preferably rectangular in cross section but upon the end of the portion 12 the same has formed an extension 13 which is preferably circular in cross section and which has its end reduced to provide oppositely beveled surfaces 14. Arranged interiorly of the heater casing and medially the top and bottom thereof and parallel therewith, is a flat partition or baffle plate 15 which extends entirely across the width of the heater casing and approximately the length thereof, said plate terminating adjacent the closed end of the body portion 9, so that water from the tank 16 may circulate on both sides of the said plate. It will also be seen from an inspection of Fig. 2 that, owing to the beveled construction of the portion 13, the end of the plate 15 adjacent this portion will project beyond the inner end of the beveled portion 14.

The circular end or extension 13 is mounted in a stuffing box 17 including a plate 18 riveted to the inner surface of the wall of the tank 16, said end 13 projecting through an opening in the said plate and into the tank so that the cold water will enter the lower space formed by the partition or baffle plate 15, pass downwardly through the portion 11 into the body 9, and around the other end of said plate 15 and back into the tank 16 through the upper space formed by said plate. This continuous circulation of the water through the heater chamber will heat said water until the entire contents of the tank 16 are brought to the temperature desired.

I claim:—

1. In a water heater, the combination with a stove including an oven and a fire box, of a heater casing including an elongated body portion of rectangular formation in cross section and extending through opposite walls of the fire box, the casing having an upwardly inclined portion at one end of said body portion, a circular extension forming a continuation of said upwardly inclined portion and adapted to be projected into a tank, and a baffle plate arranged in said heater casing medially of the top and bottom thereof and extending for approximately the entire length thereof.

2. In a water heater, the combination with a stove including an oven and a fire box, of a heater casing including an elongated body portion of rectangular formation in cross section, the said body portion extending through corresponding openings in the walls of the fire box and arranged at an inclination within said fire box, the said body portion being closed at one end and having a means at said end for engaging the edge of the opening in the wall of the fire box, the casing having an upwardly inclined portion at the other end of said body portion, a circular extension forming a continuation of said upwardly inclined portion and adapted to be projected into the tank, said circular extension having its ends reduced to provide oppositely beveled surfaces, and a baffle plate arranged in said heater casing and extending for approximately the entire length thereof, the end of said plate adjacent said circular extension projecting beyond the inner ends of said beveled surfaces.

3. A water heater comprising a heater casing adapted to be mounted in the fire box of a stove, and including an elongated body portion having one end closed and provided in its bottom at said end with engaging means, and its other end provided with a diagonal portion, an extension projecting from said diagonal portion and in parallel relation with said body portion, and a baffle plate arranged in said heater casing and extending approximately the entire length thereof, said plate terminating short of the closed end of said casing.

4. A water heater comprising a heater casing including an elongated body portion, an extension forming a part of said body portion and projecting in a different plane therefrom, the extremity of said extension being oppositely beveled, and a baffle plate extending longitudinally of said body portion and said extension for approximately the entire length thereof, the end of said baffle plate adjacent said extension projecting beyond the inner ends of the beveled surfaces thereof.

5. A water heater comprising a heater casing, including an elongated body portion adapted to be mounted in the fire box of a stove, and having a notch in its bottom at one end adapted to engage the fire box to hold the casing in position, an extension forming a part of said body portion and arranged in a different plane therefrom, and a baffle plate extending longitudinally of said body portion and said extension for approximately the entire length thereof.

VAN KING ROBINSON.

Witnesses:
Wm. D. Taylor,
E. N. Roberts.

Copies of this patent may be obtained for five cents each, by addressing the "Commissioner of Patents, Washington, D. C."